United States Patent
Alvarez Arevalo et al.

(10) Patent No.: US 8,064,470 B2
(45) Date of Patent: Nov. 22, 2011

(54) TRANSMITTING RECORDED MATERIAL (75) Inventors: Roberto Alvarez Arevalo, Ipswich (GB); Rory S Turnbull, Ipswich (GB)

(73) Assignee: British Telecommunications public limited company, London (GB)

( * ) Notice: Subject to any disclaimer, the term of this patent is extended or adjusted under 35 U.S.C. 154(b) by 522 days.

(21) Appl. No.: 10/593,587

(22) PCT Filed: Mar. 16, 2005

(86) PCT No.: PCT/GB2005/001011
§ 371 (c)(1),
(2), (4) Date: Sep. 21, 2006

(87) PCT Pub. No.: WO2005/093995
PCT Pub. Date: Oct. 6, 2005

(65) Prior Publication Data
US 2008/0025340 A1    Jan. 31, 2008

(30) Foreign Application Priority Data

Mar. 26, 2004 (GB) ................................. 0406901.9

(51) Int. Cl.
*H04L 12/28* (2006.01)
(52) U.S. Cl. .................... 370/412; 370/94.1; 370/100.1; 370/112; 370/400; 370/498; 348/423; 348/461; 348/465; 348/518
(58) Field of Classification Search .................. 370/94.1, 370/94.2, 100.1, 110.1, 112, 400, 410, 412, 370/498; 348/423, 461, 464, 465, 512, 518
See application file for complete search history.

(56) References Cited

U.S. PATENT DOCUMENTS

| 4,419,699 | A | * | 12/1983 | Christopher et al. ......... 386/113 |
| 5,025,458 | A | | 6/1991 | Casper et al. |
| 5,430,485 | A | * | 7/1995 | Lankford et al. .......... 348/423.1 |
| 5,534,937 | A | | 7/1996 | Zhu et al. |
| 5,598,352 | A | * | 1/1997 | Rosenau et al. ............... 715/203 |
| 5,768,527 | A | * | 6/1998 | Zhu et al. ....................... 709/231 |
| 5,874,997 | A | * | 2/1999 | Haigh ...................... 375/240.25 |
| 5,923,655 | A | * | 7/1999 | Veschi et al. .................. 370/394 |
| 5,949,410 | A | * | 9/1999 | Fung .............................. 715/203 |
| 5,953,350 | A | | 9/1999 | Higgins |
| 6,014,694 | A | | 1/2000 | Aharoni et al. |
| 6,016,307 | A | | 1/2000 | Kaplan et al. |

(Continued)

FOREIGN PATENT DOCUMENTS

CN    1426235    6/2003

(Continued)

OTHER PUBLICATIONS

International Search Report dated May 20, 2005.

(Continued)

*Primary Examiner* — Salman Ahmed
*Assistant Examiner* — Andrew C Lee
(74) *Attorney, Agent, or Firm* — Nixon & Vanderhye P.C.

(57) ABSTRACT

Recorded material such as video is transmitted in compressed form to a receiver, which has a buffer for smoothing differences between the data rate received and that consumed by a decoder that follows. The whole of the recording is analysed to determine a point at which to commence playing such that no buffer underflow can occur; the decoder commences playing only when this point has been reached.

24 Claims, 4 Drawing Sheets

U.S. PATENT DOCUMENTS

| | | | |
|---|---|---|---|
| 6,085,221 A * | 7/2000 | Graf | 709/202 |
| 6,101,221 A * | 8/2000 | Varanasi et al. | 375/240 |
| 6,130,987 A * | 10/2000 | Tanaka | 386/96 |
| 6,148,135 A * | 11/2000 | Suzuki | 386/12 |
| 6,169,843 B1 * | 1/2001 | Lenihan et al. | 386/46 |
| 6,195,368 B1 * | 2/2001 | Gratacap | 370/535 |
| 6,223,211 B1 * | 4/2001 | Hamilton et al. | 709/203 |
| 6,332,157 B1 | 12/2001 | Mighdoll et al. | |
| 6,366,614 B1 | 4/2002 | Pian et al. | |
| 6,397,251 B1 | 5/2002 | Graf | |
| 6,438,317 B1 * | 8/2002 | Imahashi et al. | 386/109 |
| 6,452,922 B1 | 9/2002 | Ho | |
| 6,453,112 B2 * | 9/2002 | Imahashi et al. | 386/46 |
| 6,502,125 B1 | 12/2002 | Kenner et al. | |
| 6,560,334 B1 | 5/2003 | Mullaney et al. | |
| 6,678,332 B1 * | 1/2004 | Gardere et al. | 375/240.26 |
| 6,704,288 B1 | 3/2004 | Dziekan et al. | |
| 6,771,703 B1 * | 8/2004 | Oguz et al. | 375/240.03 |
| 6,792,047 B1 * | 9/2004 | Bixby et al. | 375/240.26 |
| 6,931,071 B2 * | 8/2005 | Haddad et al. | 375/240.28 |
| 6,976,208 B1 * | 12/2005 | Kim et al. | 715/201 |
| 7,016,970 B2 * | 3/2006 | Harumoto et al. | 709/233 |
| 7,096,481 B1 * | 8/2006 | Forecast et al. | 725/32 |
| 7,111,061 B2 | 9/2006 | Leighton et al. | |
| 7,333,721 B2 * | 2/2008 | Maehashi et al. | 386/112 |
| 7,340,505 B2 | 3/2008 | Lisiecki et al. | |
| 7,471,874 B2 * | 12/2008 | Kanemaru et al. | 386/68 |
| 7,558,869 B2 * | 7/2009 | Leon et al. | 709/231 |
| 7,620,137 B2 * | 11/2009 | Lottis et al. | 375/372 |
| 2002/0031120 A1 * | 3/2002 | Rakib | 370/386 |
| 2002/0100052 A1 * | 7/2002 | Daniels | 725/87 |
| 2002/0102978 A1 | 8/2002 | Yahagi | |
| 2002/0136205 A1 * | 9/2002 | Sasaki | 370/352 |
| 2003/0002482 A1 | 1/2003 | Kubler et al. | |
| 2003/0053416 A1 | 3/2003 | Ribas-Corbera et al. | |
| 2003/0145007 A1 | 7/2003 | Kenner et al. | |
| 2003/0169777 A1 | 9/2003 | Fuse | |
| 2003/0233666 A1 * | 12/2003 | Onomatsu et al. | 725/134 |
| 2004/0141731 A1 * | 7/2004 | Ishioka et al. | 386/111 |
| 2005/0071876 A1 * | 3/2005 | van Beek | 725/62 |
| 2005/0117891 A1 * | 6/2005 | Suzuki | 386/96 |

FOREIGN PATENT DOCUMENTS

| | | |
|---|---|---|
| DE | 10125017 A1 | 12/2002 |
| EP | 0817488 A2 | 1/1998 |
| EP | 0868084 A1 | 9/1998 |
| EP | 0966175 A2 | 12/1999 |
| WO | WO 95/22233 | 8/1995 |
| WO | WO 99/65026 | 12/1999 |
| WO | WO 01/89142 A2 | 11/2001 |
| WO | 02/49343 A1 | 6/2002 |
| WO | WO 02/49343 A1 | 6/2002 |
| WO | WO 02/095637 A2 | 11/2002 |

OTHER PUBLICATIONS

UK Search Report dated Aug. 3, 2004.

Guojun Lu et al, "An Efficient Communication Scheme for Media On-Demand Services with Hard QoS Guarantees", Journal of Network and Computer Applications, 'Online!, vol. 21, No. 1, Jan. 19998, pp. 1-15, XP002328926.

Yeom et al, "An Efficient Transmission Mechanism for Stored Video", Protocols for Multimedia Systems—Multimedia Networking, 1997, Proceedings, IEEE Conference on Santiago, Chile Nov. 24-27, 1997, Los Alamitos, CA, USA, IEEE Comput. Soc., US, Nov. 24, 1997, pp. 122-130, XP010258820.

McManus et al., "Video-On-Demand Over ATM: Constant-Rate Transmission and Transport", IEEE Journal on Selected Areas in Communications, IEEE Inc., New York, US, vol. 14, No. 6, Aug. 1, 1996, pp. 1087-1098, XP000608049.

International Search Report, Appln. No. PCT/GB2004/003331, dated Sep. 28, 2004.

UK Search Report, Appln. No. GB 0319251.5, dated Dec. 16, 2003.

Office Action issued in European Appln. No. 05718057.2, dated Oct. 18, 2007.

International Search Report re PCT/GB2004/001253 mailed Sep. 15, 2004 (search conducted Sep. 8, 2004).

Hwang, et al., "ITU-T Recommendation H.261 Video Coder-Decoder," 1997, Digital Consumer Electronics Handbook, XX, XX, pp. 1001-1026, I, XP001059410.

Anastasiadis, et al., "Server-Based Smoothing of Variable Bit-Rate Streams," ACM Multimedia, 2001, pp. 147-158.

Zimmermann, et al., "A Multi-Threshold Online Smoothing Technique for Variable Rate Multimedia Streams," (Abstract only—paper is not due to be published until 2006) at http://idefix.usc.edu/pubs/mtfc.html.

Mohan, et al., "Adapting Multimedia Internet Content for Universal Access," IEEE Transactions on Multimedia, vol. 1, No. 1, Mar. 1999, pp. 104-114.

Makaroff, et al., "An Evaluation of VBR Disk Admission Algorithms for Continuous Media File Servers," Proc. of ACM Multimedia '97, Seattle, Washington (1997).

Notice of Allowance mailed Jan. 25, 2010, in U.S. Appl. No. 10/549,912.

Examiner's Answer mailed May 19, 2009, in U.S. Appl. No. 10/549,912.

Advisory Action mailed Dec. 2, 2008, in U.S. Appl. No. 10/549,912.

Final Office Action mailed Aug. 5, 2008, in U.S. Appl. No. 10/549,912.

Office Action mailed Jan. 23, 2008, in U.S. Appl. No. 10/549,912.

Office Action (5 pgs.) dated May 22, 2009 issued in corresponding Chinese Application No. 200580009650.1 with an at least partial English-language translation thereof.

English-language translation of Notice of Reasons for Rejection dated Apr. 1, 2010, issued in corresponding Japanese Application No. 2007-504458.

English-language translation of Decision of Rejection dated Dec. 20, 2010 issued in corresponding Japanese Application No. 2007-504458.

* cited by examiner

TRANSMITTING RECORDED MATERIAL

RELATED APPLICATION

This application is related to Ser. No. 10/549,912 filed Sep. 20, 2005, naming Messrs. Alvarez-Arevalo, Turnbull and Walker as co-inventors.

This application is the US national phase of international application PCT/GB2005/001011 filed 16 Mar. 2005 which designated the U.S. and claims benefit of GB 0406901.9, dated 26 Mar. 2004, the entire content of which is hereby incorporated by reference.

FIELD OF TECHNOLOGY

The present invention is concerned with methods and apparatus for transmitting recorded material, such as video, audio of other material to be played in real time, over a network.

BACKGROUND AND SUMMARY

According to one aspect of the present invention, there is provided a method of transmitting a recording comprising:

commencing transmission thereof;

holding received data in a receiver buffer; and commencing playing of said received data;

characterised by the steps of analysing the whole of the recording to determine a point at which to commence playing such that no buffer underflow can occur; and commencing playing only when this point has been reached.

In another aspect, the invention provides a method of transmitting a recording comprising:

commencing transmission thereof;

holding received data in a receiver buffer; and commencing playing of said received data;

characterised by the steps of:

analysing the whole of the recording to identify a first section at the beginning thereof which meets the condition that it covers a playing time interval greater than or equal to the maximum of the timing error for a following section of any length, each timing error being defined as the extent to which the transmission time of the respective following section exceeds its playing time interval; and causing the receiver to commencing playing only after said first section has been received.

Further aspects of the invention are set out in the claims.

BRIEF DESCRIPTION OF DRAWINGS

Some embodiments of the invention will now be described, by way of example, with reference to the accompanying drawings, in which.

DETAILED DESCRIPTION

Figure 1:
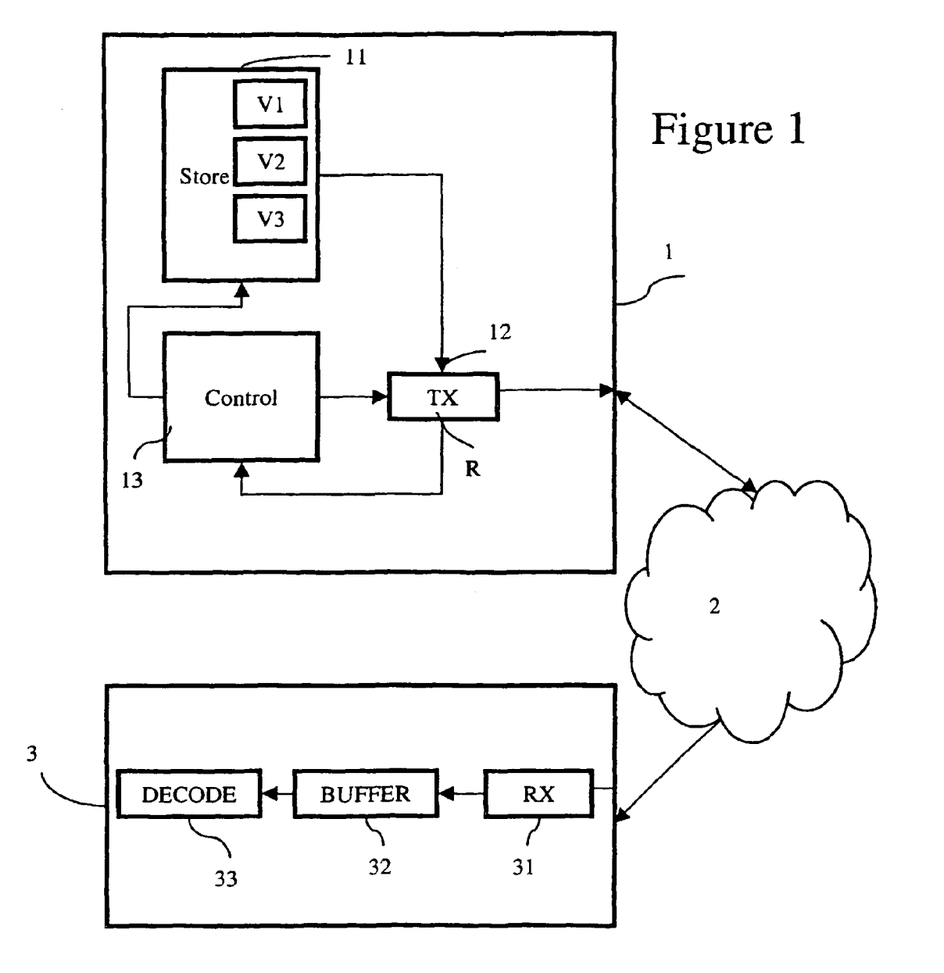
FIG. 1 is a block diagram of a transmission system embodying the invention.

In FIG. 1, a streamer 1 contains (or has access to) a store 11 in which are stored files each being a compressed version of a video sequence, encoded using a conventional compression algorithm such as that defined in the ITU standard H.261 or H.263, or one of the ISO MPEG standards. Naturally one may store similar recordings of further video sequences, but this is not important to the principles of operation.

By "bit-rate" here is meant the bit-rate generated by the original encoder and consumed by the ultimate decoder; in general, this is not the same as the rate at which the streamer actually transmits, which will be referred to as the transmitting bit-rate. It should also be noted that these files are generated at a variable bit-rate (VBR)—that is, the number of bits generated for any particular frame of the video depends on the picture content. Consequently, references to bit-rate refer to the average bit-rate.

The server has a transmitter 12 which serves to output data via a network 2 to a terminal 3. The transmitter is conventional, perhaps operating with a well known protocol such as TCP/IP. A control unit 13 serves in conventional manner to receive requests from the terminal for delivery of a particular sequence, and to read packets of data from the store 11 for sending to the transmitter 12 as and when the transmitter is able to receive them. Here it is assumed that the data are read out as discrete packets, often one packet per frame of video, though the possibility of generating more than one packet for a single frame is not excluded. (Whilst is in principle possible for a single packet to contain data for more than one frame, this is not usually of much interest in practice).

Note that these packets are not necessarily related to any packet structure used on the network 2.

The terminal 3 has a receiver 31, a buffer 32, and a decoder 33.

Some networks (including TCP/IP networks) have the characteristic that the available transmitting data rate fluctuates according to the degree of loading on the network.

Some theoretical discussion is in order at this point.

Figure 2:
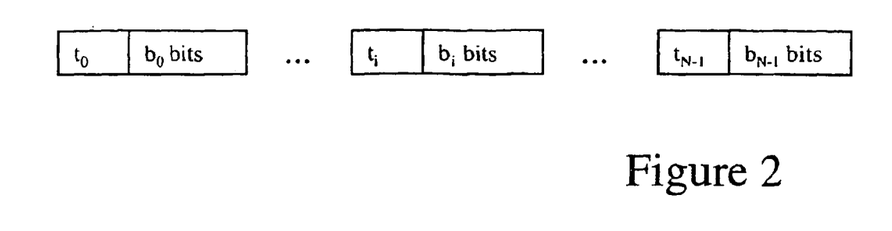
FIG. 2 is a timing diagram.

As shown in FIG. 2, an encoded video sequence consists of N packets. Each packet has a header containing a time index $t_i$ (i=0 ... N−1) (in terms of real display time—e.g. this could be the video frame number) and contains $b_i$ bits. This analysis assumes that packet i must be completely received before it can be decoded (i.e. one must buffer the whole packet first).

In a simple case, each packet corresponds to one frame, and the time-stamps $t_i$ increase monotonically, that is, $t_{i+1} > t_i$ for all i. If however a frame can give rise to two or more packets (each with the same $t_i$) then $t_{i+1} \geq t_i$. If frames can run out of capture-and-display sequence (as in MPEG) then the $t_i$ do not increase monotonically. Also, in practice, some frames may be dropped, so that there will be no frame for a particular value of $t_i$.

These times are relative. Suppose the receiver has received packet 0 and starts decoding packet 0 at time $t_{ref}+t_0$. At "time now" of $t_{ref}+t_g$ the receiver has received packet $t_g$ (and possibly more packets too) and has just started to decode packet g.

Packets g to h−1 are in the buffer. Note that (in the simple case) if h=g+1 then the buffer contains packet g only. At time $t_{ref}+t_j$ the decoder is required to start decoding packet j. Therefore, at that time $t_{ref}+t_j$ the decoder will need to have received all packets up to and including packet j.

The time available from now up to $$t_{ref}+t_j \text{ is } (t_{ref}+t_j)-(t_{ref}+t_g)=t_j-t_g. \quad (1)$$

The data to be sent in that time are that for packets h to j, viz.

$$\sum_{i=h}^{j} b_i \qquad (2)$$

which at a transmitting rate R will require a transmission duration $$\frac{\sum_{i=h}^{j} b_i}{R} \qquad (3)$$

This is possible only if this transmission duration is less than or equal to the time available, i.e. when the currently available transmitting rate R satisfies the inequality $$\frac{\sum_{i=h}^{j} b_i}{R} \leq t_j - t_g \qquad (4)$$

Note that this is the condition for satisfactory reception and decoding of packet j: satisfactory transmission of the whole of the remaining sequence requires that this condition be satisfied for all j=h . . . N−1.

For reasons that will become apparent, we rewrite Equation (4) as:

$$\frac{\sum_{i=h}^{j} b_i}{R} - (t_j - t_{h-1}) \leq t_{h-1} - t_g \qquad (5)$$

Note that $$t_j - t_{h-1} = \sum_{i=h}^{j} (t_i - t_{i-1}) = \sum_{i=h}^{j} \Delta t_i \text{ where } \Delta t_i = t_i - t_{i-1}.$$

Also, we define $\Delta \epsilon_i = (b_i/R) - \Delta t_i$

Note that $t_{h-1} - t_g$ is the difference between the time-stamp of the most recently received packet in the buffer and the time stamp of the least recently received packet in the buffer—i.e. the one that we have just started to decode.

Then the condition is $$\sum_{i=h}^{j} \Delta \epsilon_i \leq t_{h-1} - t_g \qquad (6)$$

For a successful transmission up to the last packet N−1, this condition must be satisfied for any possible j, viz.

$$\text{Max}_{j=h}^{j=N-1} \left\{ \sum_{i=h}^{j} \Delta \epsilon_i \right\} \leq t_{h-1} - t_g \qquad (7)$$

The left-hand side of Equation (7) represents the maximum timing error that may occur from the transmission of packet h up to the end of the sequence, and the condition states, in effect that this error must not exceed the ability of the receiver buffer to accommodate it, given its current contents. For convenience, we will label the left-hand side of Equation (7) as $T_h$—i.e.

$$T_h = \text{Max}_{j=h}^{j=N-1} \left\{ \sum_{i=h}^{j} \Delta \epsilon_i \right\} \qquad (8)$$

So that Equation (7) may be written as $$T_h \leq t_{h-1} - t_g \qquad (9)$$

Consider the situation at time $t_g = t_0$, that is, when the decoder is to commence decoding of the first packet. In the general case, the above condition will not be satisfied when there is only one packet in the buffer (h=1). The receiver waits for the buffer contents to reach a satisfactory level before it commences decoding. Using the above condition, it becomes apparent that the receiver should wait at least until the buffer contains packet H−1 where H is the smallest value of h for which the condition $$T_h \leq t_{h-1} - t_0 \qquad (10)$$

is satisfied.

In this embodiment of the invention, one of the functions of the control unit 13 is that, each time it sends a packet to the transmitter 12, it evaluates the test embodied in Equation 10.

Figure 3:
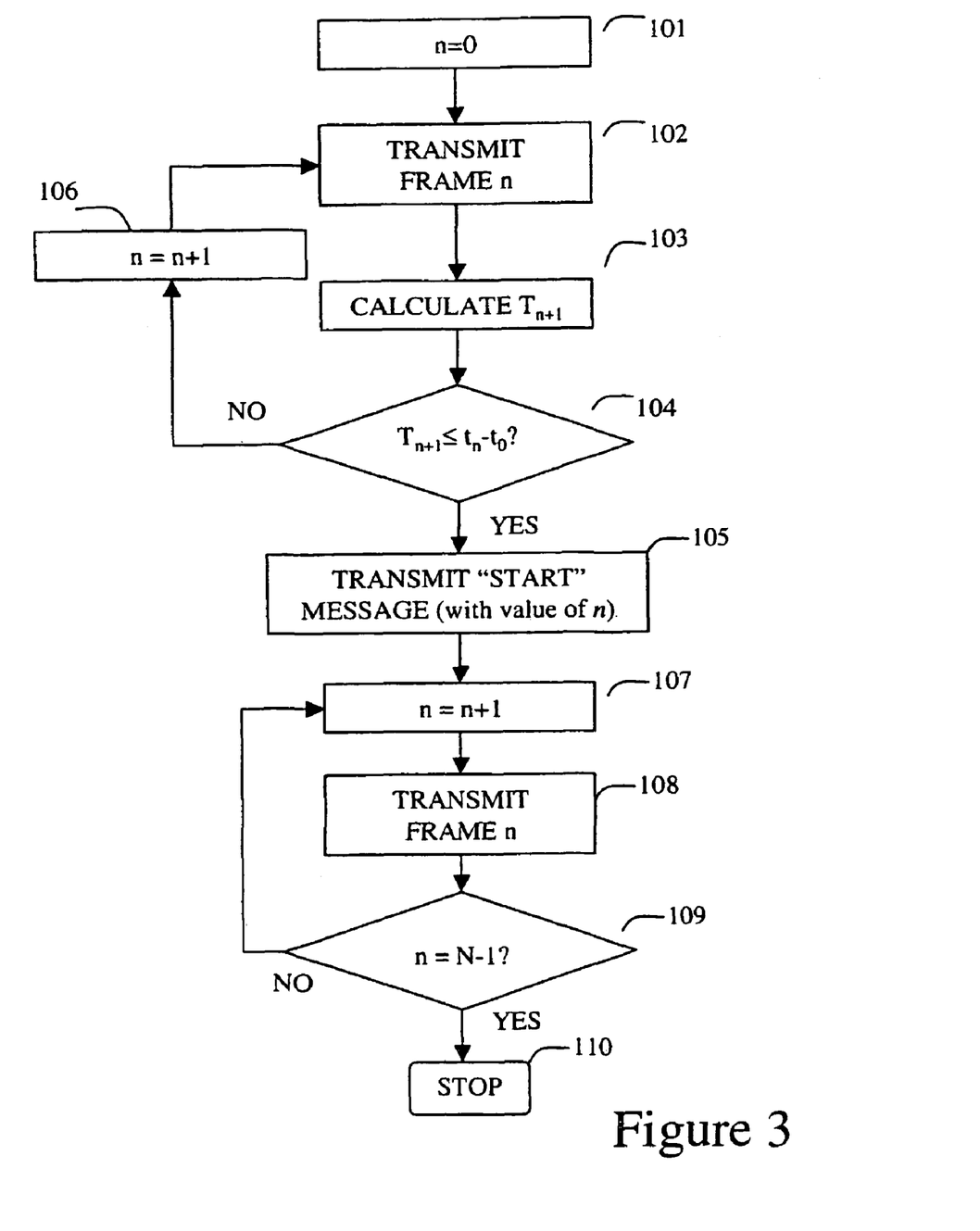
FIG. 3 is a flowchart explaining the operation of the control unit shown in FIG. 1.

FIG. 3 is a flowchart showing operation of the control unit. At step 101 a packet counter is reset. Then (102) the first packet (or on subsequent iterations, the next packet) is read from the store 11 and sent to the transmitter 12. At step 103, the control unit computes the value of $T_n$. At this point, the counter n points to the last packet sent, whereas Equation (10) is formulated for the last packet sent being h−1. Consequently the calculation at step 103 is of $T_{n+1}$ and the test performed at step 104 is whether $T_{n+1} \leq t_n - t_0$.

If this test is not passed, the packet counter is incremented at 106 and control returns to step 102 where, as soon as the transmitter is ready to accept it, a further packet is read out and transmitted. If the test is passed, then it is known that the receiver is safe to begin decoding as soon as it has received this packet. Therefore at step 105 the control unit sends to the transmitter a "start" message to be sent to the receiver. When the receiver receives this start message, it begins decoding. If there is any possibility of messages being received in a different order from that in which they were sent, then the start message should contain the packet index n so that the receiver may check that packet n has actually been received before it commences decoding. Alternatively, the transmitter could send values of $T_{n+1}$ to the receiver, and the receiver itself performs the test.

Following the sending of the "start" message, the packet counter is incremented at 107 and another frame transmitted at 108: these steps are repeated until the end of the file is reached, this being recognised at 109 and the process terminates at 110.

The preceding description assumes that the control unit performs this calculation each time it sends a packet to the transmitter, which is computationally quite intensive. An alternative is to perform the calculation less often, perhaps once every five packets, which reduces the amount of computation but may result in the buffering of more frames than is necessary.

Another alternative is to complete the computation as soon as it is able to do so (i.e. without waiting for the next packet) and then send a start message (with starting packet number) to the receiver. A yet further alternative is to perform the computation before transmitting any packets at all. Once the value of h is determined, we then transmit packets 0 to h−1 in reverse order (packet h−1, packet h−2, ... packet 0). In this case it ceases to be necessary to transmit an explicit "start" command. Standard receivers that support UDP transport protocol are able to reorder packets, and will automatically wait until packet 0 has arrived before commencing decoding. In fact, it is sufficient that packet 0 is withheld until after packets 1 to h−1 have been sent (whose order is immaterial).

This however precludes the possibility of taking into account changes in the transmitting data rate R during the waiting period, and is therefore satisfactory only if such changes are not expected.

Observe (by inspection of Equation (3)) that the significance of the rate R is in calculating the time taken to send packets h to j. Therefore the actual rate used to transmit packets 0 to h−1 is of no consequence as it does not affect the result.

Another attractive option is to perform as much as possible of the computation in advance. If a system in which only one value of R is possible, or permitted, then the computation of $T_{n+1}$ at step 103 and the test of step 104 can be performed in advance for each frame up to the point where the test is passed, and the result recorded in the file, for example by recording the corresponding value of n in a separate field at the start of the file, or by attaching a special flag to frame n itself. Thus in FIG. 3, steps 103 and 104 would be replaced by the test "is current value of n equal to the value of n stored in the file?"; or "does current frame contain the start flag?". Alternatively the separate field (or flag) could be forwarded to the receiver and this recognition process performed at the receiving end.

Figure 4:
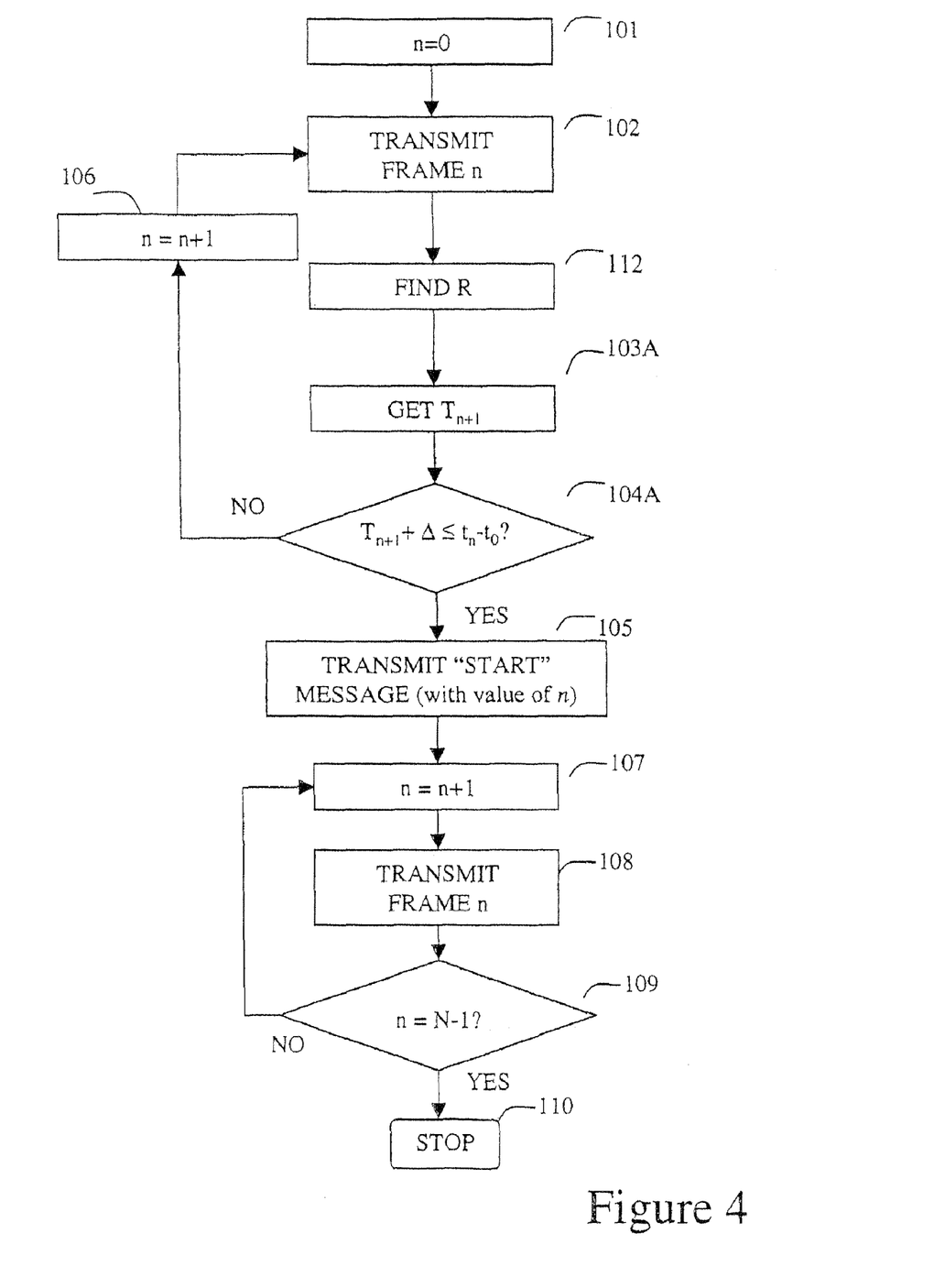
FIG. 4 is a flowchart explaining an alternative mode of operation of the control unit.

FIG. 4 shows a flowchart of a process for dealing with the situation where the transmitting data rate R varies. In principle this involves $T_h$ for every packet and storing this value in the packet header. In practice however it is necessary to compute them for a sufficient number of frames (perhaps 250 frames at 25 frames per second) at the beginning of the sequence that one is confident that the test will be passed within this period. Unfortunately, the calculation of $T_h$ involves the value of R, which is of course unknown at the time of this pre-processing. Therefore we proceed by calculating $T_h$ for a selection of possible values of R, for example (if $R_A$ is the average bit rate of the file in question)

$R_1 = 0.5 R_A$ $R_2 = 0.7 R_A$ $R_3 = R_A$ $R_4 = 1.3 R_A$ $R_5 = 2 R_A$

So each packet h has these five precalculated values of $T_h$ stored in it. If required (for the purposes to be discussed below) one may also store the relative time position at which the maximum in Equation (8)) occurs, that is, $\Delta t_{h\ max} = t_{j\ max} - t_h$ where $t_{j\ max}$ is the value of j in Equation 8 for which $T_h$ is obtained.

In this case the flowchart proceeds as follows following transmission of frame n:

112: interrogate the transmitter 12 to determine the available transmitting rate R;

103A: EITHER—in the event that R corresponds to one of the rates for which $T_h$ has been precalculated—read this value from the store;

OR—in the event that R does not so correspond, read from the store the value of $T_h$ (and, if required, $t_{h\ max}$) that correspond to the highest one ($R^-$) of the rates $R_1 \ldots R_5$ that is less than the actual value of R, and estimate $T_h$ from it;

104A: Apply the test $T_{n+1} + \Delta \leq t_n - t_0$, where $\Delta$ is a fixed safety margin;

Continue as before.

The estimate of $T_h$ could be performed simply by using the value $T_h^-$ associated with $R^-$; this would work, but since it would overestimate $T_h$ it would result, at times, in the receiver waiting longer than necessary. Another option would be by linear (or other) interpolation between the values of $T_h$ stored for the two values of $R_1 \ldots R_5$ each side of the actual value R. However, our preferred approach is to calculate an estimate according to:

$$T_i' = \frac{(T_i^- + \Delta t_{i\max}^-) R^-}{R} - \Delta t_{i\max}^- \quad (11)$$

Where $R^-$ is the highest one of the rates $R_1 \ldots R_5$ that is less than the actual value of R, $T_i^-$ is the precalculated $T_h$ for this rate, $\Delta t_{i\ max}^-$ is the time from $t_i$ at which $T_i^-$ is obtained (i.e. is the accompanying value of $\Delta t_{h\ max}^-$). In the event that this method returns a negative value, we set it to zero.

Note that this is only an estimate, as $T_h$ is a nonlinear function of rate. However with this method $T_i'$ is always higher than the true value and automatically provides a safety margin (so that the margin $\Delta$ shown above may be omitted).

Note that these equations are valid for the situation where the encoding process generates two or more packets (with equal $t_i$) for one frame, and for the situation encountered in MPEG with bidirectional prediction where the frames are transmitted in the order in which they need to be decoded, rather than in order of ascending $t_i$.

We will now describe an alternative embodiment in which the mathematics is converted into an equivalent form which however, rather than performing the calculations for each packet individually, makes use of calculations already made for a preceding packet. Recalling Equation (8):

$$T_h = \text{Max}_{j=h}^{j=N-1} \left\{ \sum_{i=h}^{j} \Delta \varepsilon_i \right\}$$

which may be rewritten $$T_h = \text{Max}\left\{ \sum_{i=h}^{h} \Delta \varepsilon_i, \text{Max}_{j=h+1}^{j=N-1} \left\{ \sum_{i=h}^{h} \Delta \varepsilon_i + \sum_{i=h+1}^{j} \Delta \varepsilon_i \right\} \right\} \quad (12)$$

$$= \text{Max}\left\{ \Delta \varepsilon_h, \text{Max}_{j=h+1}^{j=N-1} \left\{ \Delta \varepsilon_h + \sum_{i=h+1}^{j} \Delta \varepsilon_i \right\} \right\}$$

$$= \Delta \varepsilon_h + \text{Max}\left\{ 0, \text{Max}_{j=h+1}^{j=N-1} \left\{ \sum_{i=h+1}^{j} \Delta \varepsilon_i \right\} \right\} \quad (13)$$

$$= \Delta \varepsilon_h + \text{Max}\{0, T_{h+1}\}$$

Provided that $T_{h+1} \geqq 0$, which will be true at the beginning of the file, this becomes $$T_h = T_{h+1} + \Delta\epsilon_h \quad (14)$$

Or generally $$T_{a+1} = T_a - \Delta\varepsilon_a$$
$$T_{a+2} = T_{a+1} - \Delta\varepsilon_{a+1} = T_a - \Delta\varepsilon_a - \Delta\varepsilon_{a+1}$$
$$T_{a+b} = T_a - \sum_{i=a}^{a+b-1} \Delta\varepsilon_i$$

If $b = h - a$ then  (15)

$$T_h = T_a - \sum_{i=a}^{h-1} \Delta\varepsilon_i$$

substituting $\Delta\varepsilon_i = \frac{b_i}{R} - \Delta t_i$ and $\Delta t_i = t_i - t_{i-1}$  (16)

$$T_h = T_a - \sum_{i=a}^{h-1} \frac{b_i}{R} + \sum_{i=a}^{h-1} \Delta t_i = T_a - \sum_{i=a}^{h-1} \frac{b_i}{R} + (t_{h-1} - t_{a-1})$$

If $a = 0$, then $T_h = T_0 - \sum_{i=0}^{h-1} \frac{b_i}{R} + (t_{h-1} - t_{-1})$ If $a = 1$, then $T_h = T_1 - \sum_{i=1}^{h-1} \frac{b_i}{R} + (t_{h-1} - t_0)$ Consider the test $$T_h \leqq t_{h-1} - t_0$$

which may be written $$T_a - \sum_{i=a}^{h-1} \frac{b_i}{R} + (t_{h-1} - t_0) \leq t_{a-1} - t_0 \quad (17)$$

if $a=0$, this becomes $$T_0 - \sum_{i=0}^{h-1} \frac{b_i}{R} \leq t_{-1} - t_0 \quad (18)$$

Noting that $t_{-1}$ is a meaningless quantity (appearing on both sides on the inequality) so that it can be given any value, it is convenient to define $t_{-1}$ as equal to $t_0$, whence we obtain $$T_0 \leq \sum_{i=0}^{h-1} \frac{b_i}{R} \quad (19)$$

$$\left( \text{or, if } a = 1 : T_1 \leq \sum_{i=1}^{h-1} \frac{b_i}{R} \right)$$

Thus the test of Equation (10)

$$T_h \leqq t_{h-1} - t_0$$

could instead be written $$T_0 \leq \sum_{i=0}^{h-1} \frac{b_i}{R} \quad (20)$$

Then the first test (h=1) is Test 1:

$$T_0 \leq \frac{b_0}{R}?$$

Or, if we define $$Z_x = T_0 - \frac{1}{R} \sum_{i=0}^{x-1} b_i,$$

the first test is $Z_1 \leqq 0$?
The second test is $Z_2 \leqq 0$
The xth test is $Z_x \leqq 0$
But $$Z_{x+1} = T_0 - \frac{1}{R} \sum_{i=0}^{x} b_i = T_0 - \frac{1}{R} \sum_{i=0}^{x-1} b_i - \frac{b_x}{R} = Z_x - \frac{b_x}{R}$$

Figure 5:
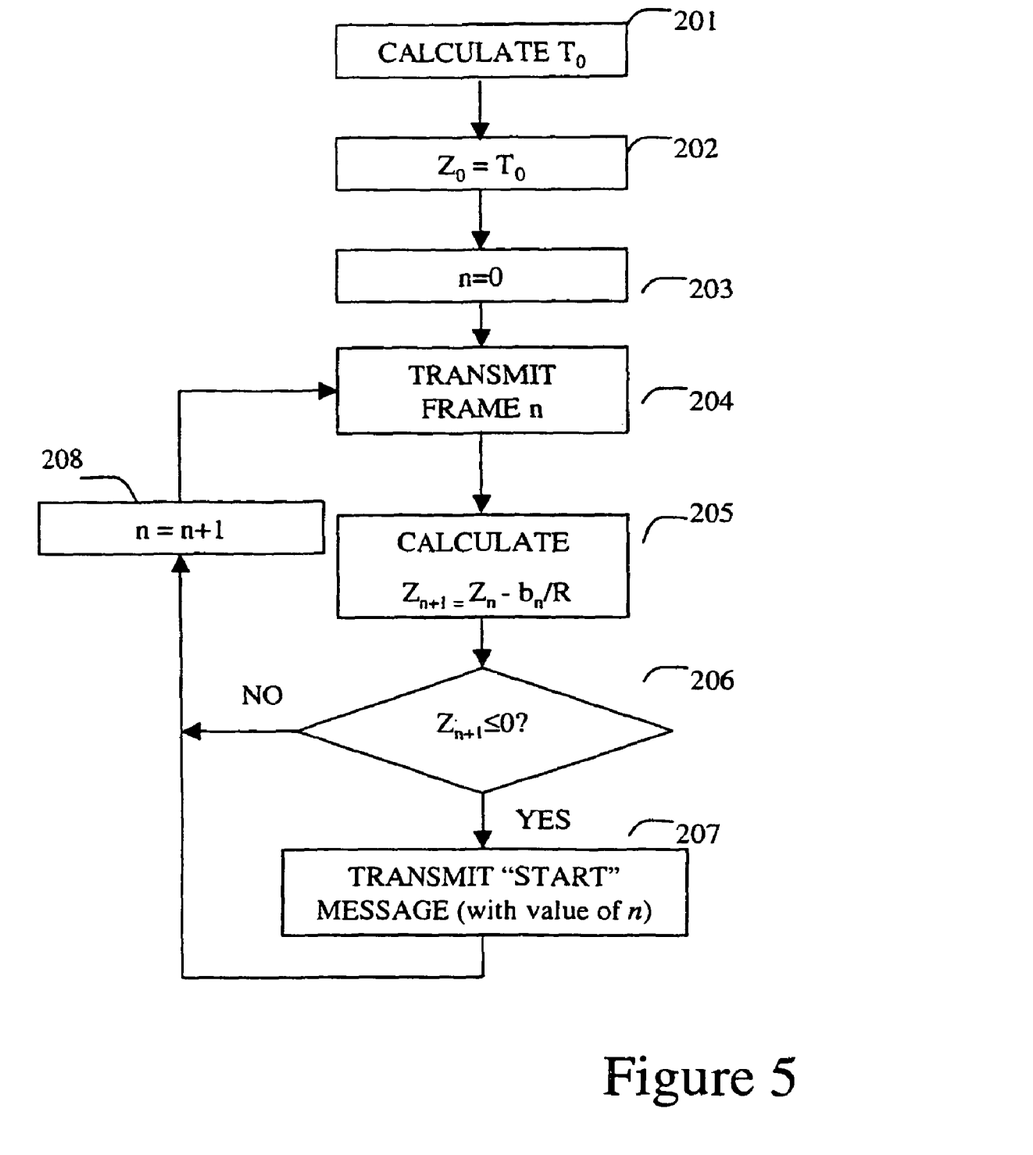
FIG. 5 is a flowchart explaining a yet further version.

So each test can update the previous value of Z, as shown in the flowchart of FIG. 5. First, at Step 201, $T_0$ is calculated in accordance with Equation (8), then (Step 202) $Z_0$ is set equal to $T_0$. At step 203 a packet counter is reset. Then (204) the first packet (or on subsequent iterations, the next packet) is read from the store 11 and sent to the transmitter 12. At step 205, the control unit computes the value of $Z_{n+1}$, and the test performed at step 206 as to whether $Z_{n+1} \leqq 0$. If the test is passed, then it is known that the receiver is safe to begin decoding as soon as it has received this packet. Therefore at step 207 the control unit sends to the transmitter a "start" message to be sent to the receiver. When the receiver receives this start message, it begins decoding. The packet counter is incremented at 208 and control returns to step 204 where, as soon as the transmitter is ready to accept it, a further packet is read out and transmitted.

The step 201 of calculating $T_0$ could be done in advance and the values stored. This procedure could of course be adapted, in a similar manner to that previously described, to accommodate different values of R.

It is not essential that this process begin with $T_0$. One could start with $T_1$ (in which case the first test is $T_1 \leqq 0$?) or, if one chooses always to buffer at least two (or more) packets one could start with $T_2$, etc.

Although the example given is for encoded video, the same method can be applied to encoded audio or indeed any other material that is to be played in real time.

If desired, in multiple-rate systems, these methods may be used in combination with the rate-switching method described in our international patent application WO04/086721 (corresponding to U.S. application Ser. No. 10/549,912).

The invention claimed is:

1. A method of transmitting a recording comprising a sequence of data packets, the method comprising:
   a server commencing transmission of the recording over the network to a receiver;
   the receiver holding received data in a receiver buffer; and
   at the server, a control unit:
   analyzing the entire said sequence of data packets to determine where a point in the transmission of the recording is reached at which, if the receiver were to commence decoding data already transmitted and held in said receiver buffer, said receiver buffer would not underflow;
   continuing transmission to the receiver,
   wherein, said analyzing comprises analyzing the entire said sequence of data packets to calculate for each of a plurality of first sections in the recording a maximum timing error value calculated as the maximum of the extent to which the transmission time of the respective following section of the recording exceeds its playing time interval for a following section of any length, wherein said point is determined as the end of the shortest first section that meets the condition that it covers a playing time interval greater than or equal to its respective maximum timing error value; and
   causing the receiver to commencing playing of received data only after said first section has been received.

2. A method according to claim 1, wherein after transmission of said first section, said receiver is caused to play by transmitting an instruction to the receiver to commence playing.

3. A method according to claim 1, comprising:
   transmitting to the receiver an instruction specifying the first section and wherein the receiver is caused to commence playing when said receiver recognizes that the first section is in said receiver buffer.

4. A method according to claim 1, in which:
   at the server, said analyzing comprises computing maximum timing error values for different sections of the sequence, and
   at the receiver, the maximum timing error values are compared with the buffer contents to recognize when said first section is in the buffer.

5. A method according to claim 1, comprising:
   withholding transmission of an initial part of the recording until a remainder of said first section has been transmitted; and
   transmitting said initial part;
   wherein the receiver commences playing only when said initial part is received.

6. A method according to claim 1, including:
   performing the analysis in advance of said transmission of said recording to the receiver; and
   marking an identified section in the recording prior to transmission of said identified section.

7. A method according to claim 1, wherein said analyzing includes:
   computing, in advance, timing error values corresponding to a plurality of transmitting data rates and storing the timing error values; and
   subsequently estimating therefrom an error value corresponding to an actual transmitting data rate.

8. A method according to claim 1, in which the analyzing comprises:
   testing a timing error parameter evaluated for successive portions of the recording,
   wherein the timing error parameter is first calculated in respect of a first or early portion of the recording and the timing error parameter for subsequent portions is obtained by updating the parameter obtained for the preceding portion.

9. A method according to claim 1, in which the recording is a video recording.

10. A method according to claim 1, in which the recording is an audio recording.

11. A method according to claim 1, wherein:
    the recording is transmitted in a network from the server to the receiver at a fluctuating transmitting data rate which is not known when the recording in its entirety is analyzed to identify a first section at the beginning of the recording which meets a condition that it covers a playing time interval greater than or equal to a maximum of an extent to which a transmission time of a respective following section exceeds its playing time interval for a following data section of any length; and wherein
    said causing the receiver comprises a control message which causes the receiver to commence playing of received data only after said first section has been received.

12. A method according to claim 1, wherein the recording is transmitted over a network and is to be played in real time by the receiver.

13. A method according to claim 1,
    wherein a timing error parameter is calculated as the extent to which the transmission time of a following section of the recording, said following section being a section following said first section, exceeds the playing time interval for said following section, and wherein the maximum timing error value is the maximum of the timing error parameters over the set of all possible following sections of any length from said first section.

14. A method according to claim 1, wherein
    a timing error parameter is calculated as the extent to which the transmission time of a following section of the recording, said following section being a section following said first section, exceeds the playing time interval for said following section, and wherein the maximum timing error value is the maximum of the timing error parameters over the set of all possible following sections of any length from said first section,
    wherein said timing error parameter is calculated as the sum of the timing errors from the end of said first section to the end of the following section and a timing error is the difference between the transmission time of a portion and the playing time of a portion.

15. An apparatus arranged to transmit a recording comprising a sequence of data packets stored in a data store accessible by a server comprising a control unit and a transmitter over a network to a receiver comprising a receiver buffer, the apparatus comprising:
    said server comprising a control unit and a transmitter,
    said receiver comprising a receiver buffer, wherein
    when the server commences transmission of the recording over the network to the receiver,
    the receiver buffer is arranged to hold received data until the receiver is caused to commence playing of received data,
    wherein at the server, the recording is analyzed by said control unit analyzing the entire said sequence of data packets to determine where a point in the transmission of the recording is reached at which, if the receiver were to commence decoding data already transmitted and held in said receiver buffer, said receiver buffer would not underflow;

wherein, the entire said sequence of data packets is analyzed to calculate for each of a plurality of first sections in the recording a maximum timing error value calculated as the maximum of the extent to which the transmission time of the respective following section of the recording exceeds its playing time interval for a following section of any length, wherein said point is determined as the end of the shortest of said plurality of first sections that meets the condition that it covers a playing time interval greater than or equal to its respective maximum timing error value, and wherein the receiver is caused to commence playing of received data after the shortest said first section that meets the condition has been received.

16. An apparatus according to claim 15, wherein the timing error parameter which calculates the extent to which the transmission time of a section of the recording following said first section exceeds the playing time interval for said first section is calculated as the sum of the timing errors from the end of said first section to the end of the following section; and wherein the maximum timing error value is the maximum of the timing error parameters over the set of all possible following sections of any length from said first section.

17. A method of transmitting a recording comprising a sequence of data packets, the method comprising:

commencing, using a server, transmission of the recording over the network to a receiver configured to hold received data in a receiver buffer; and at the server, a control unit:

analyzing the entire said sequence of data packets to determine where a point in the transmission of the recording is reached at which, if the receiver were to commence decoding data already transmitted and held in said receiver buffer, said receiver buffer would not underflow;

continuing transmission to the receiver, wherein, said analyzing comprises analyzing the entire said sequence of data packets to calculate for each of a plurality of first sections in the recording a maximum timing error value calculated as the maximum of the extent to which the transmission time of the respective following section of the recording exceeds its playing time interval for a following section of any length, wherein said point is determined as the end of the shortest of said first sections that meets the condition that it covers a playing time interval greater than or equal to its respective calculated maximum timing error value; and causing the receiver to commence playing of received data only after said shortest first section that meets the condition has been received.

18. A method of transmitting a recording comprising a sequence of data packets over a network to a receiver, the method comprising:

analyzing, prior to the transmission of the entire recording, the entire sequence of data packets of the recording to determine where a point in said transmission of the recording is reached at which, if the receiver were to commence decoding data already transmitted over said network by said server and held in a receiver buffer of said receiver, said receiver buffer would not underflow, wherein said analyzing comprises analyzing the entire said sequence of data packets to calculate for each of a plurality of first sections in the recording a maximum timing error value calculated as the maximum of the extent to which the transmission time of the respective following section of the recording exceeds its playing time interval for a following section of any length, wherein said point is determined as the end of the shortest of said first sections that meets the condition that it covers a playing time interval greater than or equal to its respective calculated maximum timing error value;

transmitting analyzed data packets over the network to said receiver arranged to hold received data in a receiver buffer; and causing the receiver to commence playing of received data only after said shortest first section that meets the condition has been received.

19. A method of transmitting a recording comprising a sequence of data packets over a network to a receiver, the method comprising:

analyzing, using a control unit, the entire said sequence of data packets to determine where a point in a transmission of the recording is reached at which, if the receiver were to commence decoding data already transmitted over said network and held in a receiver buffer, said receiver buffer would not underflow, wherein said analyzing comprises analyzing the entire said sequence of data packets to calculate for each of a plurality of first sections in the recording a maximum timing error value calculated as the maximum of the extent to which the transmission time of the respective following section of the recording exceeds its playing time interval for a following section of any length, wherein said point is determined as the end of the shortest of said first sections that meets the condition that it covers a playing time interval greater than or equal to its respective calculated maximum timing error value;

transmitting, using a transmitter, analyzed data packets over the network to a receiver arranged to hold received data in a receiver buffer; and causing the receiver to commence playing of received data only after said shortest first section that meets the condition has been received.

20. An apparatus comprising:

a transmitter arranged to transmit a recording comprising a sequence of data packets stored in a data store accessible to the server to a receiver comprising a receiver buffer; and a control unit arranged to analyze said data packets prior to their transmission by said transmitter, wherein the control unit is arranged to analyze the entire said sequence of data packets of said recording to determine where a point in the transmission of the recording is reached at which, if the receiver were to commence decoding data packets from said sequence already transmitted and held in said receiver buffer, said receiver buffer would not underflow;

wherein, the entire said sequence of data packets is analyzed to calculate for each of a plurality of first sections in the recording a maximum timing error value calculated as the maximum of the extent to which the transmission time of the respective following section of the recording exceeds its playing time interval for a following section of any length, wherein said point is determined as the end of the shortest of said plurality of first sections that meets the condition that it covers a playing time interval greater than or equal to its respective maximum timing error value, and means to cause, after the transmitter has transmitted said first section to the receiver, said receiver to commence playing of received data after said first section has been received.

21. A method of transmitting a recording comprising a sequence of data packets, the method comprising:
commencing, using a server, transmission of the recording over the network to a receiver; and
causing the receiver to commence playing of received data only after said shortest first section that meets a pre-determined condition has been received;
wherein said pre-determined condition was determined from an analysis of the entire said sequence of data packets to determine where a point in a transmission of the recording would be reached for predetermined transmission conditions at which, if the receiver were to commence decoding data already transmitted under said predetermined transmission conditions and held in said receiver buffer, said receiver buffer would not underflow, the analysis comprising an analysis of the entire said sequence of data packets to calculate for each of a plurality of first sections in the recording a maximum timing error value calculated as the maximum of the extent to which the transmission time under said predetermined timing conditions of the respective following section of the recording exceeds its playing time interval for a following section of any length, wherein said point is determined as the end of the shortest first section that meets the condition that it covers a playing time interval greater than or equal to its respective maximum timing error value.

22. A method of analyzing a recording comprising a sequence of data packets for transmission over a network to a receiver, the analysis determining when the receiver is to start to play received data packets, the method comprising:
analyzing, prior to the transmission of the entire recording, the entire sequence of data packets of the recording to determine where a point in said transmission of the recording is reached at which, if the receiver were to commence decoding data already transmitted over said network by said server and held in a receiver buffer of said receiver, said receiver buffer would not underflow,
wherein said analyzing comprises analyzing the entire said sequence of data packets to calculate for each of a plurality of first sections in the recording a maximum timing error value calculated as the maximum of the extent to which the transmission time of the respective following section of the recording exceeds its playing time interval for a following section of any length, wherein said point is determined as the end of the shortest of said first sections that meets the condition that it covers a playing time interval greater than or equal to its respective calculated maximum timing error value, and
wherein, when the analyzed data packets are transmitted over the network to said receiver arranged to hold received data in said receiver buffer, the receiver is caused to commence playing of received data only after said shortest first section that meets the condition has been received by the receiver.

23. An apparatus arranged to analyze a recording comprising a sequence of data packets for transmission over a network to a receiver, the analysis determining when the receiver is to start to play received data packets, the apparatus comprising:
a control unit arranged to analyze, prior to the transmission of the entire recording, the entire sequence of data packets of the recording to determine where a point in said transmission of the recording is reached at which, if the receiver were to commence decoding data already transmitted over said network by said server and held in a receiver buffer of said receiver, said receiver buffer would not underflow,
wherein said control unit analyzes the entire said sequence of data packets to calculate for each of a plurality of first sections in the recording a maximum timing error value calculated as the maximum of the extent to which the transmission time of the respective following section of the recording exceeds its playing time interval for a following section of any length, wherein said point is determined as the end of the shortest of said first sections that meets the condition that it covers a playing time interval greater than or equal to its respective calculated maximum timing error value,
whereby, when the analyzed data packets are transmitted over the network to said receiver arranged to hold received data in said receiver buffer, the transmission includes data generated by said analysis arranged to cause said receiver to commence playing of received data only after said shortest first section that meets the condition has been received by the receiver.

24. A non-transitory data store of analyzed data recordings, the data store being accessible by a transmitter arranged to transmit a said analyzed data recording accessed from said data store to a receiver comprising a receiver buffer for holding data before the receiver commences playing data, wherein a stored analyzed data recording comprises:
a sequence of data packets analyzed by a control unit, the analysis comprising an analysis of the entire said sequence of data packets to determine when, in a transmission of the recording at a pre-determined rate, a point in the recording is reached at which, if the receiver were to commence decoding data already transmitted at said pre-determined rate and held in said receiver buffer, said receiver buffer would not underflow;
wherein the analysis of the entire said sequence of data packets of a recording calculates for each of a plurality of first sections in the recording a maximum timing error value calculated as the maximum of the extent to which the transmission time of the respective following section of the recording exceeds its playing time interval for a following section of any length, wherein said point is determined as the end of the shortest of said plurality of first sections that meets the condition that it covers a playing time interval greater than or equal to its respective maximum timing error value,
wherein the analysis provides control data to be stored with said data recording, the control data causing the receiver to commence playing of received data after the shortest said first section that meets the condition has been received.

* * * * *